(12) United States Patent
Tan et al.

(10) Patent No.: US 11,449,383 B2
(45) Date of Patent: Sep. 20, 2022

(54) METHODS FOR PROVIDING AND IDENTIFYING FATAL ERROR INFORMATION FOR SYSTEM-ON-CHIP PRODUCT

(71) Applicants: Inventec (Pudong) Technology Corporation, Shanghai (CN); INVENTEC CORPORATION, Taipei (TW)

(72) Inventors: Xianle Tan, Shanghai (CN); Zhongying Qu, Shanghai (CN); Chin Hsing Lu, Taipei (TW); Yangeng Wang, Shanghai (CN)

(73) Assignees: Inventec (Pudong) Technology Corporation, Shanghai (CN); INVENTEC CORPORATION, Taipei (TW)

( * ) Notice: Subject to any disclaimer, the term of this patent is extended or adjusted under 35 U.S.C. 154(b) by 70 days.

(21) Appl. No.: 17/029,060

(22) Filed: Sep. 23, 2020

(65) Prior Publication Data

US 2022/0066861 A1 Mar. 3, 2022

(30) Foreign Application Priority Data

Aug. 27, 2020 (CN) .......................... 202010880860.4

(51) Int. Cl.
*G06F 11/00* (2006.01)
*G06F 11/07* (2006.01)
*G06F 13/20* (2006.01)
*G06F 13/42* (2006.01)

(52) U.S. Cl.
CPC ...... *G06F 11/0793* (2013.01); *G06F 11/0721* (2013.01); *G06F 11/0751* (2013.01); *G06F 13/20* (2013.01); *G06F 13/4282* (2013.01); *G06F 2213/0016* (2013.01)

(58) Field of Classification Search
CPC ............ G06F 11/0793; G06F 11/0721; G06F 11/0751; G06F 11/079; G06F 11/0784; G06F 11/0787; G06F 11/0706; G06F 11/0766; G06F 11/0769; G06F 11/0772; G06F 11/0775
See application file for complete search history.

(56) References Cited

U.S. PATENT DOCUMENTS

| | | | |
|---|---|---|---|
| 2006/0041803 A1* | 2/2006 | Woodward | G06F 11/24 714/E11.154 |
| 2013/0212425 A1* | 8/2013 | Blaine | G06F 11/3648 714/6.1 |

* cited by examiner

*Primary Examiner* — Katherine Lin

(57) ABSTRACT

The present disclosure provides a method for providing a fatal error of a system-on-chip product and a method for identifying a fatal error of a system-on-chip product. The system-on-chip product includes a processor. The method for providing a fatal error of a system-on-chip product includes: when a fatal error occurs, setting a port value of a preset port of the processor as a preset value corresponding to the fatal error; converting the preset value into register data accessible to an external server, such that the external server can identify the fatal error that occurs in the system-on-chip product according to the preset value when acquiring the register data. Through the present disclosure, even if the system-on-chip product does not support a baseboard management controller, the user of the baseboard can still obtain the reason for the error of the product through an out-of-band method.

7 Claims, 2 Drawing Sheets

---

When a fatal error occurs, setting a port value of a preset port of the processor corresponding to the fatal error to a preset value corresponding to the fatal error — S21

Converting the preset value into register data accessible to an external server, such that the external server can identify the fatal error occurs in the system-on-chip product according to the preset value when acquiring the register data — S22

METHODS FOR PROVIDING AND IDENTIFYING FATAL ERROR INFORMATION FOR SYSTEM-ON-CHIP PRODUCT

CROSS REFERENCE TO RELATED APPLICATION

This application claims the benefits of priority to Chinese Patent Application No. CN 2020108808604, entitled "Method for Providing Fatal Error of System-On-Chip Product and Method for Identifying Fatal Error of System-On-Chip Product", filed with CNIPA on Aug. 27, 2020, the contents of which are incorporated herein by reference in its entirety.

BACKGROUND

Field of Disclosure

The present disclosure relates to the technical field of system-on-chip products, in particular, to a method for providing fatal errors of system-on-chip products and a method for identifying fatal errors of system-on-chip products.

Description of Related Arts

At present, the system-on-chip products (i.e., SOC products) do not support the Baseboard Management Controller (BMC). As a result, system-on-chip products cannot sense fatal errors out-of-band when fatal errors occur, and users cannot supervise and deal with problems when errors occur in system-on-chip products.

SUMMARY

The present disclosure provides a method for providing fatal errors of a system-on-chip product and a method for identifying fatal errors of a system-on-chip product.

The present disclosure provides a method for providing a fatal error of a system-on-chip product. The system-on-chip product includes a processor. The method includes: when a fatal error occurs, setting a port value of a preset port of the processor corresponding to the fatal error to a preset value corresponding to the fatal error; converting the preset value into register data accessible to an external server, such that the external server can identify the fatal error occurs in the system-on-chip product according to the preset value when acquiring the register data.

In an embodiment of the present disclosure, the system-on-chip product includes a basic input output system, and the preset port includes a general-purpose input/output port and a serial general-purpose input/output port; the fatal error includes an internal error and an uncorrectable error; if the fatal error is the internal error, the general-purpose input/output port is set up; if the fatal error is the uncorrectable error, the basic input output system parses the type of the error, and sets the port value of the serial general-purpose input/output port according to the type.

In an embodiment of the present disclosure, the system-on-chip product includes a complex programmable logic device, the complex programmable logic device includes an error status register. The method further includes: polling, via the complex programmable logic device, the general-purpose input/output port, and setting the port value of the general-purpose input/output port when the general-purpose input/output port is set up; storing, via the complex programmable logic device, the port value of the general-purpose input/output port and the port value of the serial general-purpose input/output port in the error status register.

In an embodiment of the present disclosure, the error status register includes a current error status register and a previous error status register. The port value of the general-purpose input/output port and the port value of the serial general-purpose input/output port are stored in the current error status register. The method further includes: if the system-on-chip product restarts after the fatal error occurs, the complex programmable logic device copies the data of the current error status register to the previous error status register and clears the data of the current error status register.

In an embodiment of the present disclosure, the method further includes: converting, via the complex programmable logic device, the data of the error status register into an I2C signal.

In an embodiment of the present disclosure, the method further includes: receiving, via the complex programmable logic device, a clear command sent by the external server; clearing, via the complex programmable logic device, the data of the error status register.

The present disclosure provides a method for identifying a fatal error of a system-on-chip product, which is applied to a server and includes: obtaining a port value of a preset port of a processor of the system-on-chip product; treating the fatal error corresponding to the port value as the fatal error occurring in the system-on-chip product, and recording the fatal error.

In an embodiment of the present disclosure, the preset port includes a general-purpose input/output port and a serial general-purpose input/output port; the server includes a baseboard management controller, and the system-on-chip product includes a complex programmable logic device. The method further includes: polling, via the baseboard management controller, the I2C signal of the complex programmable logic device, to obtain the port value of the general-purpose input/output port and the port value of the serial general-purpose input/output port from the error status register of the complex programmable logic device according to the I2C signal, and recording the port values.

In an embodiment of the present disclosure, the error status register includes a current error register and a previous error register. The method further includes: when the system-on-chip product restarts due to a fatal error, copying the data in the current error register to the previous error register, and obtaining, via the baseboard management controller, the port value of the preset port from the previous error register; otherwise, obtaining the port value of the preset port from the current error register.

In an embodiment of the present disclosure, the method further includes: translating the identified fatal error into the user language, and displaying the user language; sending a clear command to the system-on-chip product, such that the system-on-chip product clears the record data of the fatal error.

As described above, the method for providing a fatal error of a system-on-chip product and the method for identifying a fatal error of a system-on-chip product have the following beneficial effects:

1. If the system-on-chip product does not support a baseboard management controller, the user of the server baseboard can still obtain the cause of the error occurring in the system-on-chip product through an out-of-band method of the baseboard management controller.

2. After the system-on-chip product is restarted due to a fatal error, the complex programmable logic device can still record the error of the last restart of the system-on-chip product via the previous error register PES (Previous Error Status), thus the baseboard management controller of the server baseboard can get the reason of the last restart.

3. The method of the present disclosure is highly expandable and can record various types of errors.

DETAILED DESCRIPTION OF THE PREFERRED EMBODIMENTS

The embodiments of the present disclosure will be described below. Those skilled in the art can easily understand other advantages and effects of the present disclosure according to contents disclosed by the specification. The present disclosure can also be implemented or applied through other different exemplary embodiments. Various modifications or changes can also be made to all details in the specification based on different points of view and applications without departing from the spirit of the present disclosure. It needs to be stated that the following embodiments and the features in the embodiments can be combined with one another under the situation of no conflict.

It needs to be stated that the drawings provided in the following embodiments are just used for schematically describing the basic concept of the present disclosure, thus only illustrating components related to the present disclosure and are not drawn according to the numbers, shapes and sizes of components during actual implementation, the configuration, number and scale of each component during actual implementation thereof may be freely changed, and the component layout configuration thereof may be more complicated.

Traditional system-on-chip products do not support a baseboard management controller. As a result, system-on-chip products cannot sense fatal errors out-of-band when fatal errors occur, and users cannot supervise and deal with problems when errors occur in system-on-chip products. The present disclosure provides a method for providing a fatal error of a system-on-chip product and a method for identifying a fatal error of a system-on-chip product, to solve the problems in the traditional technology.

Figure 1:
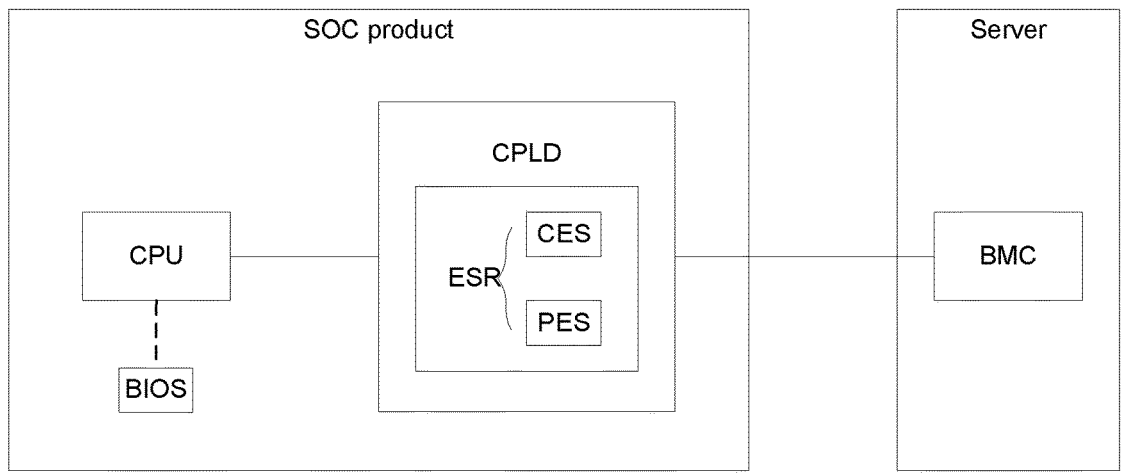
FIG. 1 is a schematic diagram of an application scenario according to an embodiment of the present disclosure.

FIG. 1 is a schematic diagram of an application scenario of the method for providing a fatal error of a system-on-chip product and the method for identifying a fatal error of a system-on-chip product according to an embodiment of the present disclosure. The system-on-chip product at least includes a processor CPU, a complex programmable logic device CPLD and a basic input output system BIOS respectively connected with the processor CPU. It should be noted that the basic input output system BIOS may be connected with the processor CPU through an integrated south bridge PCH, which is not limited by the present disclosure.

The complex programmable logic device CPLD includes an error status register (ESR). Preferably, the error status register further includes a current error status register (CES) and a previous error status register (PES).

The system-on-chip product does not support a baseboard management controller. The server contains a baseboard management controller. The system-on-chip product is inserted in the PCIE slot of the server baseboard in the form of a plug-in card. The design of present disclosure is to allow users of the server baseboard to obtain the data of the error status register in the complex programmable logic device of the system-on-chip product through the baseboard management controller of the server, so as to identify the error occurring in the system-on-chip product according to the preset correspondence between the data and various errors.

Figure 2:
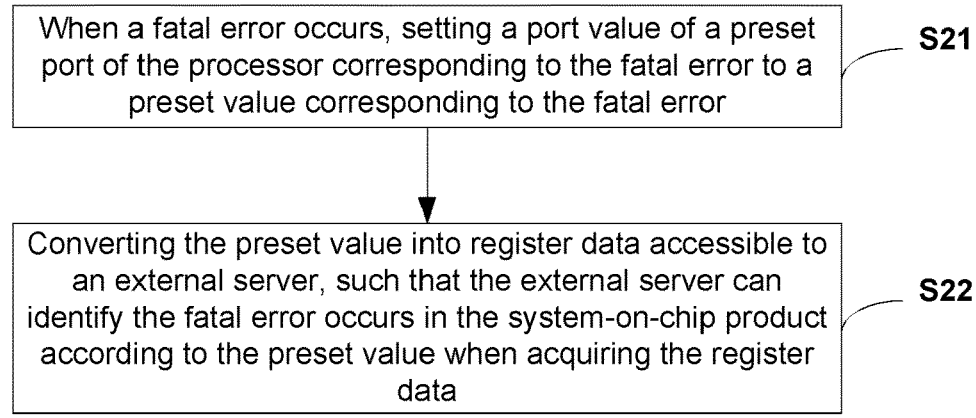
FIG. 2 shows a flow chart of a method for providing a fatal error of an SOC product in an embodiment of the present disclosure.
Figure 3:
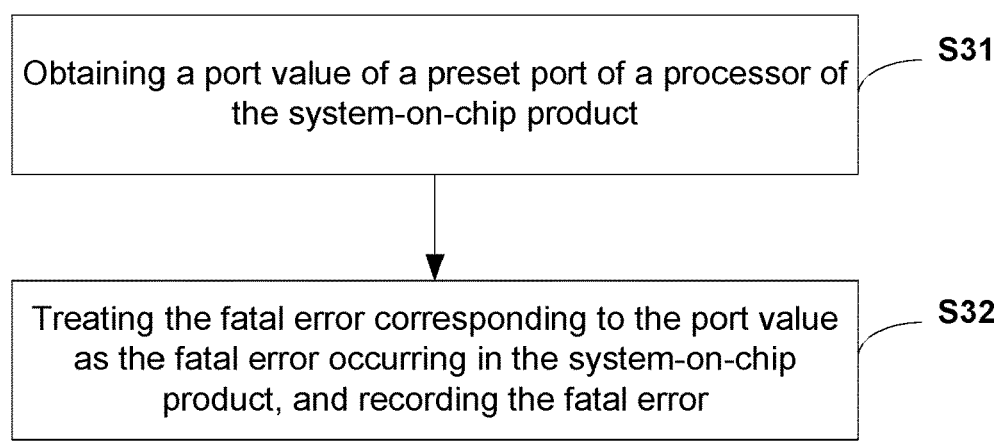
FIG. 3 shows a flow chart of a method for identifying a fatal error of an SOC product in an embodiment of the present disclosure.

As shown in FIG. 2, this embodiment provides a method for providing a fatal error of a system-on-chip product, which is executed by the system-on-chip product shown in FIG. 1. The method includes the following:

S21: when a fatal error occurs, setting a port value of a preset port of the processor corresponding to the fatal error to a preset value corresponding to the fatal error;

S22: converting the preset value into register data accessible to an external server, such that the external server can identify the fatal error occurs in the system-on-chip product according to the preset value when acquiring the register data.

In detail, the preset port includes a general-purpose input/output port (GPIO) and a serial general-purpose input/output port (SGPIO). The fatal error includes an internal error (IERR) and an uncorrected error (UCE).

If the fatal error that occurs in the system-on-chip product is the uncorrectable error, the basic input output system of the system-on-chip product parses the type of the error, and sets the port value of the serial general-purpose input/output port. If the fatal error that occurs in the system-on-chip product is the internal error, the general-purpose input/output port of the processor of the system-on-chip product is set up (for example, continuously changing from the original high 1 to the low 0). Specifically, the complex programmable logic device of the system-on-chip product polls the general-purpose input/output port, sets the port value of the general-purpose input/output port when the general-purpose input/output port is set up, and stores the port value of the general-purpose input/output port and the port value of the serial general-purpose input/output port in the error status register of the system-on-chip product.

In an embodiment, further, the port value of the general-purpose input/output port and the port value of the serial general-purpose input/output port are stored in the current error status register. If the system-on-chip product restarts after the fatal error occurs, the complex programmable logic device copies the data of the current error status register to the previous error status register and clears the data of the current error status register. Preferably, the complex programmable logic device clears the data of the error status register when receiving the clear command sent by the external server.

In an embodiment, further, the complex programmable logic device converts the data of the error status register into an I2C signal, such that the server identifies the error occurring in the system-on-chip product by polling the data of the error status register of the system-on-chip product through the I2C.

As shown in FIG. 2, this embodiment provides a method for identifying a fatal error of a system-on-chip product, which is executed by the server shown in FIG. 1. The method includes the following:

S31: obtaining a port value of a preset port of a processor of the system-on-chip product;

S32: treating the fatal error corresponding to the port value as the fatal error occurring in the system-on-chip product, and recording the fatal error.

In detail, the preset ports of the processor of the system-on-chip product include a general-purpose input/output port and a serial general-purpose input/output port. The complex programmable logic device of the system-on-chip product converts the data of the error status register into an I2C signal, and the baseboard management controller of the server polls the I2C signal of the complex programmable logic device of the system-on-chip product, to obtain, according to the I2C signal, the port value of the general-purpose input/output port and the port value of the serial general-purpose input/output port from the error status register of the complex programmable logic device, and record the port values.

In one embodiment, when the system-on-chip product restarts due to a fatal error, the data in the current error register of the system-on-chip product is copied to the previous error register of the system-on-chip product, and the baseboard management controller of the server obtains the port value of the preset port from the previous error register of the system-on-chip product. If the system-on-chip product does not restart due to a fatal error, the data in the current error register of the system-on-chip product is not copied to the previous error register of the system-on-chip product, and the baseboard management controller of the server obtains the port value of the preset port from the current error register.

In an embodiment, the server translates the identified fatal error into the user language, and displays the user language; preferably, after identifying the fatal error occurring in the system-on-chip product, the server sends a clear command to the system-on-chip product, so that the system-on-chip product clears the record data of the fatal error.

Figure 4:
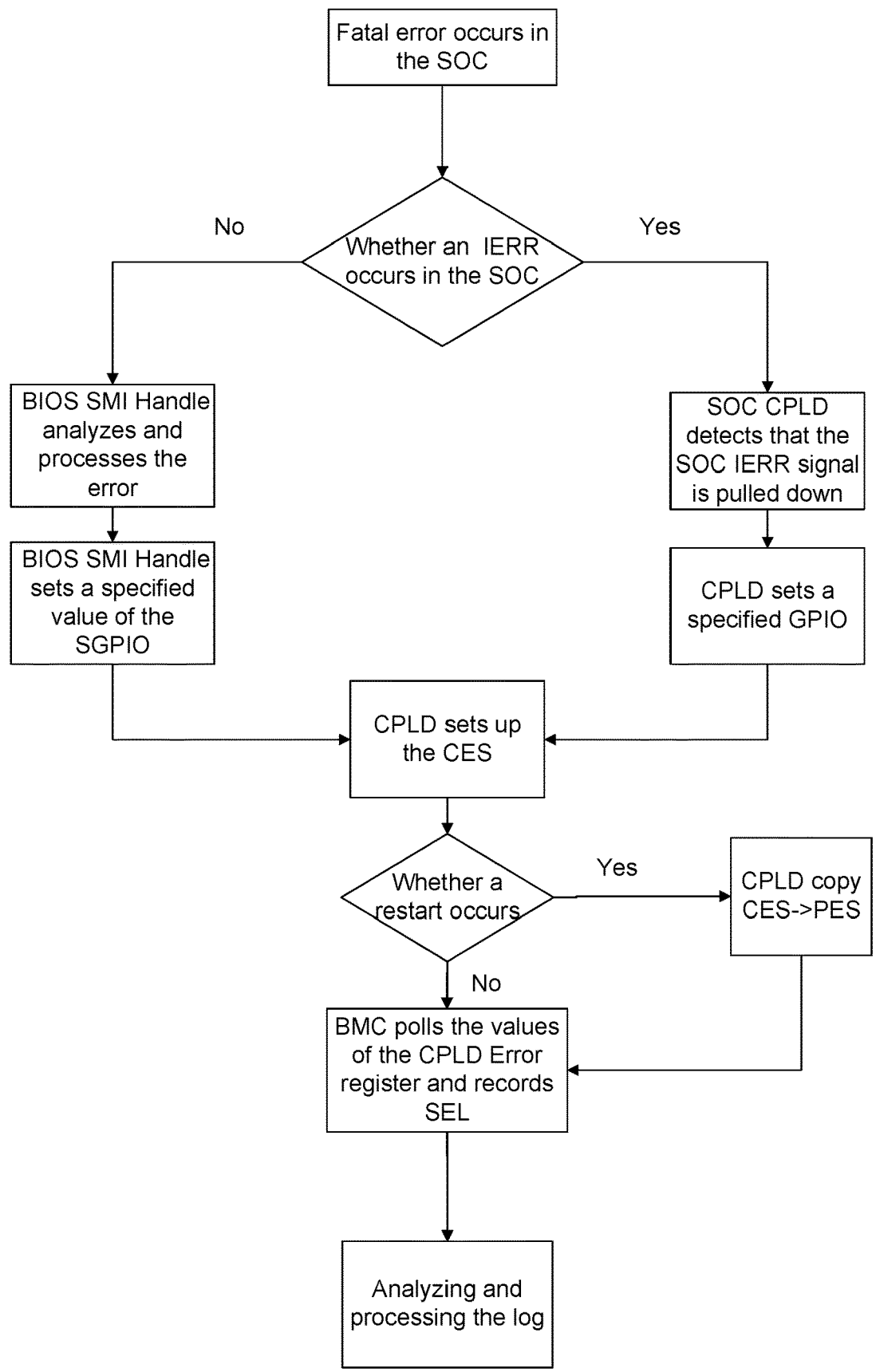
FIG. 4 shows a flow chart of a method for providing and identifying a fatal error of an SOC product in an embodiment of the present disclosure.

The method for providing a fatal error of the system-on-chip product and the method for identifying a fatal error of the system-on-chip product according to the present disclosure will be described in detail below with reference to FIGS. 1 and 4.

When a fatal error occurs in the system-on-chip product, if the error is an IERR, since an IERR cannot be processed by the BIOS, the error can only be processed by the CPLD; if the error is a UCE, then the BIOS is responsible for processing the error.

When an IERR occurs, the GPIO port of the CPU of the system-on-chip product is set up. After the CPLD polls that the GPIO port continuously changes from the original high to low, the I2C module converts the value of the GPIO port into a preset value that can be polled by the BMC of the server baseboard, and the preset value is stored in the CES of the ESR.

When a UCE occurs, the BIOS of the system-on-chip product outputs the error type to the CPLD, and sets the value of the SGPIO port of the CPU according to the specific error type. The CPLD polls the value of the SGPIO port through an SGPIO module, and then converts the value of the SGPIO port into the preset value that can be polled by the BMC of the server baseboard through an I2C module, and stores the preset value in the CES of the ESR. ESR is pre-defined, for example: 0~3 bit is CES, and 4~7 bit is PES.

In the 8 bits of ESR, the 0th or 4th bit being set up means that an IERR occurs; the 1st or 5th bit being set up means that a UCE0 occurs; the 2nd or 6th bit being set up means that a UCE1 occurs; the 3rd or 7th bit being set up means that a UCE2 occurs. UCE0~UCE2 represent three different specific types of UCE errors. The specific types include but are not limited to: multi-bit error correcting code (ECC) memory error, common data parity error (PERR), and system error (SERR).

The CPLD converts the preset values of the GPIO port and SGPIO port into I2C signals for being polled by the BMC.

When the system-on-chip product restarts due to a fatal error, the data in the CES of the system-on-chip product is copied to the PES, and the BMC of the server obtains the port values of the GPIO port and SGPIO port from the PES. Otherwise, the BMC of the server obtains the port values of the GPIO port and SGPIO port from the CES.

BMC polls the GPIO port value and SGPIO port value in the ESR of the system-on-chip product through the I2C. If the GPIO port is polled to be set up, the IERR occurring in the system-on-chip product will be identified according to the preset value of the GPIO port. If the SGPIO port is polled to be set up, the type (such as UCE0, UCE1 or UCE2) of the error occurring in the system-on-chip product will be identified according to the preset value of the SGPIO port. BMC records the port value data obtained from the ESR into a log file, and informs the user what kind of error has occurred in the system-on-chip product.

Subsequently, the BMC sends a command to the system-on-chip product to clear the record data of fatal errors recorded in the CPLD.

In summary, the present disclosure provides a method for providing a fatal error of the system-on-chip product and a method for identifying a fatal error of the system-on-chip product. Even if the system-on-chip product does not support a baseboard management controller, the user of the baseboard can still obtain the cause of the error occurring in the product through an out-of-band method. Therefore, the present disclosure effectively overcomes various shortcomings in traditional technology and has high industrial utilization value.

The above-mentioned embodiments are merely illustrative of the principle and effects of the present disclosure instead of limiting the present disclosure. Modifications or variations of the above-described embodiments may be made by those skilled in the art without departing from the spirit and scope of the disclosure. Therefore, all equivalent modifications or changes made by those who have common knowledge in the art without departing from the spirit and technical concept disclosed by the present disclosure shall be still covered by the claims of the present disclosure.

What is claimed is:

1. A method for providing fatal error information for a system-on-chip product, wherein the system-on-chip product comprises a processor, a basic input output system, and a complex programmable logic device, the processor comprises a preset port, the preset port comprises a general-purpose input/output port and a serial general-purpose input/output port, and the complex programmable logic device comprises an error status register, and the method comprises:

when a fatal error occurs, setting a port value of the preset port of the processor corresponding to the fatal error to a preset value corresponding to the fatal error;

converting the preset value into register data accessible to an external server, such that the external server identifies the fata error that occurs in the system-on-chip product according to the preset value when acquiring the register data;

if the fatal error is an internal error, setting up the general-purpose input/output port;

if the fatal error is an uncorrectable error, parsing, via the basic input output system, a type of the fatal error, and setting a port value of the serial general-purpose input/output port according to the type;

polling, via the complex programmable logic device, the general-purpose input/output port, and setting a port value of the general-purpose input/output port when setting up the general-purpose input/output port; and storing, via the complex programmable logic device, the port value of the general-purpose input/output port and the port value of the serial general-purpose input/output port in the error status register.

2. The method for providing fatal error information for the system-on-chip product according to claim 1, wherein the error status register comprises a current error status register and a previous error status register; the port value of the general-purpose input/output port and the port value of the serial general purpose input/output port are stored in the current error status register; the method further comprises:

if the system-on-chip product restarts after the fatal error occurs, copying, via the complex programmable logic device, data of the current error status register to the previous error status register, and clearing the data of the current error status register.

3. The method for providing fatal error information for the system-on-chip product according to claim 1, further comprising:

converting, via the complex programmable logic device, the data of the error status register into an I2C signal.

4. The method for providing fatal error information for the system-on-chip product according to claim 1, further comprising:

receiving via the complex programmable logic device, a clear command sent by the external server; and clearing, via the complex programmable logic device, the data of the error status register.

5. A method for identifying fatal error information for a system-on-chip product by a server, wherein the system-on-chip product comprises a processor and a complex programmable logic device, the processor comprises a preset port, the preset port comprises a general-purpose input/output port and a serial general-purpose input/output port, and the server comprises a baseboard management controller, and the method comprises:

obtaining, by the baseboard management controller, port values of the preset port of the processor of the system-on-chip product, by polling, by the baseboard management controller, an I2C signal of the complex programmable logic device, to obtain a port value of the general-purpose input/output port and a port value of the serial general-purpose input/output port from an error status register of the complex programmable logic device according to the I2C signal; and recording, by the baseboard management controller, the port value of the general-purpose input/output port and the port value of the serial general-purpose input/output port as the port values; and recording, by the baseboard management controller, a fatal error occurring in the system-on-chip product, wherein the fatal error corresponds to the port values.

6. The method for identifying fatal error information for the system-on-chip product according to claim 5, wherein the error status register comprises a current error register and a previous error register, the method further includes:

when the system-on-chip product restarts due to the fatal error, copying data in the current error register to the previous error register, and obtaining, via the baseboard management controller, the port values of the preset port from the previous error register; and when the system-on-chip product does not restart due to the fatal error, obtaining, via the baseboard management controller, the port values of the preset port from the current error register.

7. The method for identifying fatal error information for the system-on-chip product according to claim 5, further comprising:

translating an identified fatal error into a user language, and displaying the user language; and sending a clear command to the system-on-chip product, such that the system-on-chip product dears record data of the fatal error.

\* \* \* \* \*